US010263726B2

United States Patent
Breuer et al.

(10) Patent No.: US 10,263,726 B2
(45) Date of Patent: Apr. 16, 2019

(54) METHOD OF DETECTING A JAMMING TRANSMITTER AFFECTING A COMMUNICATION USER EQUIPMENT

(71) Applicant: GEMALTO M2M GmbH, Munich (DE)

(72) Inventors: Volker Breuer, Boetzow (DE); Lars Wehmeier, Falkensee (DE)

(73) Assignee: GEMALTO M2M GMBH, Munich (DE)

( * ) Notice: Subject to any disclaimer, the term of this patent is extended or adjusted under 35 U.S.C. 154(b) by 16 days.

(21) Appl. No.: 15/525,399

(22) PCT Filed: Nov. 24, 2015

(86) PCT No.: PCT/EP2015/077526
§ 371 (c)(1),
(2) Date: May 9, 2017

(87) PCT Pub. No.: WO2016/083390
PCT Pub. Date: Jun. 2, 2016

(65) Prior Publication Data
US 2017/0366294 A1 Dec. 21, 2017

(30) Foreign Application Priority Data

Nov. 28, 2014 (EP) .................................. 14195412

(51) Int. Cl.
*H04K 3/00* (2006.01)
*H04W 24/02* (2009.01)
*H04W 88/02* (2009.01)

(52) U.S. Cl.
CPC ............ *H04K 3/222* (2013.01); *H04W 24/02* (2013.01); *H04K 3/88* (2013.01); *H04K 2203/16* (2013.01); *H04W 88/02* (2013.01)

(58) Field of Classification Search
CPC ...................................................... H04K 3/222
See application file for complete search history.

(56) References Cited

U.S. PATENT DOCUMENTS 9,198,062 B2 * 11/2015 Breuer ................. H04B 1/7097
2003/0233567 A1 * 12/2003 Lynn .................... H04L 41/0893
726/23

(Continued)

FOREIGN PATENT DOCUMENTS

| EP | 2 632 068 A1 | 8/2013 |
| EP | 2 665 214 A1 | 11/2013 |
| EP | 2 665 215 A1 | 11/2013 |

OTHER PUBLICATIONS

International Search Report (PCT/ISA/210) dated Jan. 7, 2016, by the European Patent Office as the International Searching Authority for International Application No. PCT/EP2015/077526.

(Continued)

*Primary Examiner* — Michael J Moore, Jr.
(74) *Attorney, Agent, or Firm* — Buchanan Ingersoll & Rooney PC

(57) ABSTRACT

A method for detecting a jamming transmitter affecting a communication user equipment,
operating in a cellular network supporting communication in a time-division manner, including at least one active base station, on which the user equipment is camping.
In the method, the user equipment
detects that at least one downlink radio channel from the active base station is not decodable,
measures signal levels received on said downlink radio channel for a plurality of time units,
analyzes said signal level measurements, and
in case at least one time unit is detected with a signal level exceeding a predefined threshold,
detects a jamming transmitter by verifying that, in a predefined amount of successive time units, the pattern (Continued)

of a first time unit with signal level exceeding the predefined threshold, directly followed by a second time unit with a signal level below the predefined threshold, is not detected.

15 Claims, 7 Drawing Sheets

(56) References Cited

U.S. PATENT DOCUMENTS

| | | | | |
|---|---|---|---|---|
| 2004/0005858 A1* | 1/2004 | Cervinka | ............... | G08B 25/08 455/1 |
| 2007/0104085 A1* | 5/2007 | Sambhwani | ......... | H04B 1/7097 370/203 |
| 2008/0232238 A1* | 9/2008 | Agee | .................... | H04B 7/0413 370/208 |
| 2011/0092151 A1* | 4/2011 | Brisebois | ................. | H04K 3/43 455/1 |
| 2011/0319084 A1* | 12/2011 | Meshkati | .............. | H04W 36/20 455/436 |
| 2012/0106408 A1* | 5/2012 | Papasakellariou | .... | H04L 1/1614 370/280 |
| 2012/0170754 A1 | 7/2012 | Girard et al. | | |
| 2013/0344823 A1* | 12/2013 | Almgren | ............... | H04W 12/12 455/90.1 |
| 2014/0018070 A1* | 1/2014 | Ji | .......................... | H04W 48/16 455/434 |
| 2014/0349568 A1* | 11/2014 | Niemela | ................ | H04K 3/222 455/1 |
| 2015/0126181 A1* | 5/2015 | Breuer | ................... | H04K 3/222 455/423 |
| 2015/0141026 A1* | 5/2015 | Jover | ..................... | H04K 3/224 455/452.1 |
| 2015/0195849 A1* | 7/2015 | Bashar | ................. | H04W 16/14 370/330 |
| 2015/0270922 A1* | 9/2015 | Breuer | ................ | H04B 1/1027 455/423 |
| 2015/0289141 A1* | 10/2015 | Ghasemzadeh | ....... | H04W 16/14 370/330 |
| 2018/0365969 A1* | 12/2018 | Krein | .................... | G08B 25/00 |

OTHER PUBLICATIONS

Written Opinion (PCT/ISA/237) dated Jan. 7, 2016, by the European Patent Office as the International Searching Authority for International Application No. PCT/EP2015/077526.

* cited by examiner

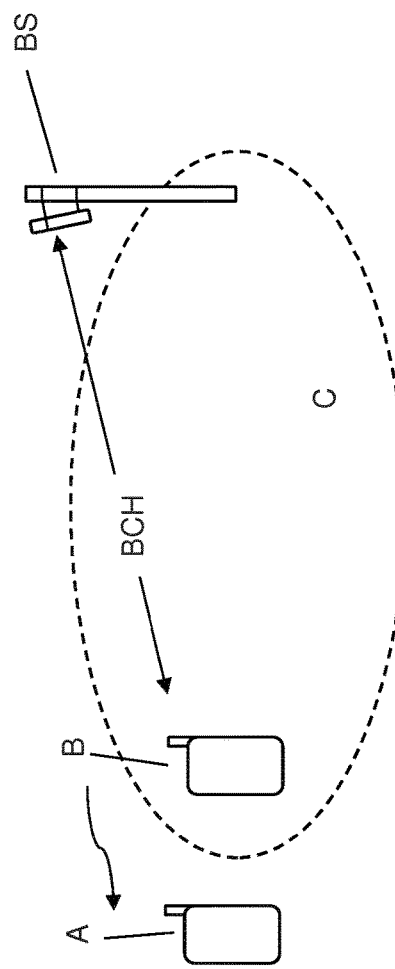
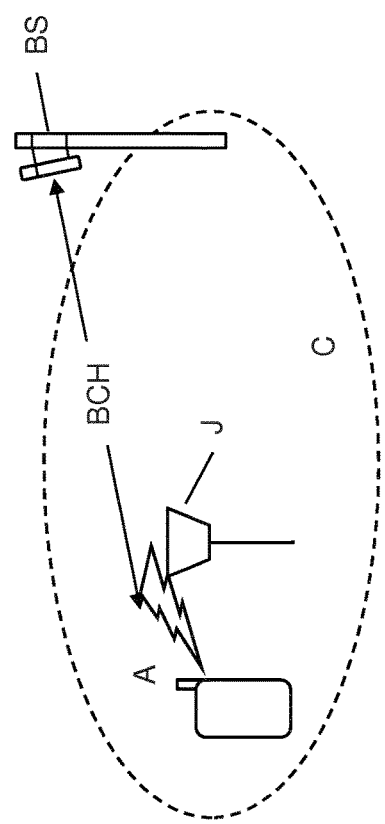

| Uplink/Downlink configuration | Up-to-Down switch periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Fig. 3

METHOD OF DETECTING A JAMMING TRANSMITTER AFFECTING A COMMUNICATION USER EQUIPMENT

FIELD OF THE INVENTION

The present invention relates to a method for detecting a jamming transmitter affecting a communication user equipment.

The invention also pertains to a communication user equipment using said method.

BACKGROUND OF THE INVENTION

In the field of wireless communication according to wireless cellular technology standards like 3GPP (UMTS, LTE, and following) there is a growing problem of hackers who try to disturb the cellular networks at their most vulnerable component: the air interface. It is known that those disturbances comprise in particular a jamming of a certain frequency range. With such jammers it is in particular possible to compromise security installations, in particular theft tracking units on a car or the like. Such a theft tracking unit is equipped with a wireless communication unit, in particular a machine-to-machine (M2M) module operating within cellular networks. Those units are configured to send a message to a security center, when the car is cracked or moved without key etc. With a jamming transmitter the ability of a common theft tracking unit to send an alert to the security center is disturbed, which results in a theft tracking unit being practically inoperative.

Therefore there is a need for methods to detect the situation of inoperativeness in order to warn the owner differently. It is in particular necessary to distinguish a jamming attack from the mere unavailability of cellular networks supported by the present device, e.g. in a parking garage or on a sea ferry.

Known solutions to solve the addressed problem are in particular oriented on frequency-division cellular network technology standards (FDD), which are characterized by the fact that the uplink and the downlink channels have separate frequency ranges.

What is still missing is a solution which is applicable to cellular networks according to time-division technology standards (TDD). Those cellular networks have the peculiarity that uplink and downlink traffic share the same frequency range. When a communication user equipment (UE) in a frequency-division cellular network cannot decode the downlink signaling from a base station, but can measure energy in the band, there is strong likelihood that a disturbance, in particular a jamming transmitter, is measured. For time-division based cellular networks the same situation is the normal situation, as other communication user equipment in the proximity could at the same time use the frequency range to conduct uplink communications. This cannot be decoded due to different coding schemes resp. scrambling codes. But this situation is unable to be used as an indicator for the presence of a jamming transmitter.

It is therefore a need for communication user equipments supporting time-division technology standards to find a new solution which can reliably distinguish the situation of a jamming transmitter affecting a communication user equipment from the normal situation and/or the situation of being out of service, in order to execute warning or other security measures.

Further alternative and advantageous solutions would, accordingly, be desirable in the art.

SUMMARY OF THE INVENTION

For this it is according to a first aspect of the invention suggested a method for detecting a jamming transmitter affecting a communication user equipment according to claim 1. It is further suggested according to a second aspect of the invention a communication user equipment according to claim 10.

It is therefore according to the first aspect of the invention proposed a method for detecting a jamming transmitter affecting a communication user equipment, said communication user equipment operating in a cellular network supporting uplink and downlink communication on one frequency band in a time-division manner, the cellular network comprising a plurality of base stations, including at least one active base station, which is the base station the communication user equipment is camping on, the method comprising the steps for the communication user equipment:
 detecting that at least one downlink radio channel from the active base station is not decodable,
 measuring signal levels received on said downlink radio channel for a plurality of time units,
 analyzing said signal level measurements,
 in case at least one time unit is detected with a signal level exceeding a predefined threshold,
 detecting a jamming transmitter by verifying the condition that in a predefined amount of successive time units the pattern of a first time unit with signal level exceeding the predefined threshold directly followed by a second time unit with a signal level below the predefined threshold is not detected.

The inventive method starts from the consideration that the communication user equipment is already operating in conjunction with a base station of the cellular network. Said base station is the active base station from perspective of the communication user equipment. The communication user equipment is in particular a mobile handset or a machine-to-machine (M2M) device configured to operate in the cellular network. The cellular network is supporting a time-division communication, in particular TDD, in particular TDD-LTE (Long term evolution) or TD-SCDMA-UMTS (Time Division Synchronous Code Division Multiple Access Universal Mobile Telecommunication System). This type is characterized in that the uplink and the downlink communication are conducted on the same frequency band, which means a sharing of frequencies.

The communication user equipment is in status of camping on the active base station. This in particular means that it is registered to the active base station and is exchanging measurements and area update messages. The communication user equipment preferably operating in idle mode, that is without opened connection, but a connected mode and intermediate modes, including opened contexts for packet based communication are encompassed as well.

For the latter it is preferred that upon detection of a downlink radio channel from the active base station additional steps are conducted in order to set the communication user equipment in a status comparable to an idle mode.

Effectively the communication user equipment successfully received at least once a decodable downlink radio channel from the active base station. The downlink radio channel in this sense can both be a physical and a logical channel. Further it is not limiting that the frequency band used of the downlink radio channel is also used as uplink radio channel, which is typical for TDD cellular networks.

The method starts with the situation that at least one downlink radio channel from the active base station is not decodable anymore. Generally this is a situation which not unexpectedly affects a communication user equipment in particular when it is moving. Here the main task is to distinguish if this is a normal situation of leaving the coverage area of the active base station or if a jamming transmitter is overlapping the signaling with its own noise.

This situation can even be worse, which means that more than one downlink radio channel is affected by the jamming transmitter. Therefore the inventive method is dedicated to detect both wideband jamming transmitter, affecting a couple of frequency bands and narrowband jamming transmitter, only affecting one or a few frequency bands, and hence communication channels.

In response to this situation it is foreseen to measure the signal levels received on the affected downlink radio channel. The measured signal level preferably corresponds to the received power spectral density over time. Alternative signal level measurements in particular the received signal strength indication (RSSI) are however also encompassed.

Further alternative signal measurements include the measurements of the energy performed on the full bandwidth or only on parts of the bandwidth containing reference signals corresponding to E-UTRA carrier RSSI (full bandwidth) or only reference signals resulting in RSRP (Reference Signal Received Power) or as quality measure in RSRQ (Reference Signal Received Quality).

This measurement is conducted for a predefined number of time units. This is to make sure to finally really achieve a result, but on the same time not to indicate each minimal disruption as a jamming.

Preferably the plurality of time units corresponds to a frame. A frame resp. radio frame in the context of wireless communication in particular for LTE, is a measure of 10 Milliseconds, comprising one or two half-frames and 10 subframes, each consisting of two slots.

Depending on the requested sensitivity of the jamming detection and the security requirements the amount of considered frames are to be defined. Generally with one frame a reliable jamming detection with the inventive method should be possible, but if a higher reliability is favored rather than a quick result, it is advised to enhance the predefined amount of time units by more than one frame.

In case of a special frame structure comprising two switching points between uplink and downlink sending a reliable detection could even be done on half-frame basis.

It is further advantageous to measure a predefined amount of successive time units in order to figure out if the jamming transmitter is permanently affecting the downlink radio channel.

With the measured signal levels over the plurality of time units then an analyzing step is carried out.

This analyzing comprises first if over the measured amount of time units at least one time unit is detected where the signal level is exceeding a predefined threshold. With this it is envisaged to figure out if at least once the signal was detectable.

Therefore it is in a preferred embodiment proposed that the predefined threshold of signal level corresponds to the decoding limit. With this embodiment it can be sorted out the situation that on the downlink radio channel no signals are sent. This would at least mean that no jamming transmitter is present, and with no signal level above the decoding limit it is for sure that the next operating base station is out of reach.

But still this is not sufficient to surely distinguish if a jamming transmitter is present, as another communication user equipment might be in the neighbourhood and send on that radio channel, so no out of service situation is detected but still the inability to decode the downlink radio channel might does not allow the result that a jamming transmitter is affecting the communication user equipment.

Hence there is a need to make another analyzing step. As part of this it is contested the condition that a certain pattern of signal level over successive time units is found in the signal level measurements. This pattern consists of a time unit with a signal level exceeding the predefined threshold directly followed by a second time unit with a signal level below the predefined threshold.

If this pattern is found, then a normal situation as sketched out before is present. Therefore an absence of this pattern indicates that a jamming transmitter is present.

In a preferred embodiment the pattern corresponds to a specific frame structure including a special subframe comprising a downlink pilot time slot and a guard period, wherein the first time unit and the second time unit are time units being part of the special subframe, and wherein the first time unit is part of the downlink pilot time slot and the second time unit is part of the guard period.

This embodiment corresponds to the frame structure of LTE-TDD according to TS36.211. According to that a frame or half-frame includes a special subframe, which comprises of three time units in the succession downlink pilot time slot (DwPTS), guard period (GP) and uplink pilot time slot (UpPTS). The guard period always for each frame is configured to provide a signal level of the absolute minimum, which means at least below the decoding limit. The downlink pilot time slot compared to that provides in the coverage area of a signal level a base station above the decoding limit.

It is therefore for checking the condition as part of the analysis preferable to check for the existence of a DwPTS followed by the guard period. According to the specification the guard period is in any case that long that it can be detected. A pattern of special subframes comprising the DwPTS and the GP is distributed over a frame differently depending upon the uplink and downlink configuration, but at least once per frame it is present. This leads to the situation that depending on the uplink/downlink configuration the jamming is detectable according to the inventive method at least after one frame, but in certain configurations even within a half-frame.

It is therefore suggested to take into account the uplink/downlink configuration for defining the amount of time units needed to have a first reliable indication of a jamming transmitter affecting the communication user equipment.

Once a jamming transmitter is detected with the inventive method, then it needs to be reported. According to another advantageous embodiment it is suggested a method wherein said communication user equipment comprises a communication unit and a control unit, characterized in that upon detection of the jamming transmitter by the communication unit, the communication unit sending a jamming indication to the control unit, and the control unit alerting the user.

This embodiment relates to a communication user equipment which comprises a communication unit separate from the main control unit of the equipment. This is in particular the case for machine-to-machine devices, when they are equipped with a machine-to-machine-module.

In particular the communication unit is communicatively coupled with the control unit, in particular the rest of the communication user equipment. Such a coupling is in particular with standard interfaces, like USB, which supports the AT command set according to Hayes AT standard for modems.

According to this embodiment advantageously the communication unit is configured to carry out the steps according to the inventive method. Once the jamming transmitter is detected, it informs the control unit about this fact with a jamming detection. This is in particular done via an unsolicited resource code (URC) according to the AT standard indicating the jamming detection. Preferably the control unit upon initialization first registers for jamming detection indications, and only in that case the communication unit executes the respective method steps and sends the URC in case a jamming transmitter is detected.

Depending upon the device of the communication user equipment there are different requirements in terms of reliability vs. time until the detection of a jamming transmitter. If time is the crucial criterion, but a false alarm is tolerable, then the first frame or half-frame, where the above pattern cannot be found would be sufficient to launch a jamming alert.

If the reliability is crucial, it is advantageous to have at least a second frame resp. half-frame where the pattern needs to be found. It is advantageous to make the reliability requirement configurable.

Therefore according to another preferred embodiment it is proposed that the communication user equipment further comprising a jamming probability counter, and the method further comprising the steps:
  upon detection of a jamming transmitter increasing the jamming probability counter,
  verifying if jamming probability counter exceeds a jamming probability threshold value,
  in case jamming probability threshold value is exceeded sending said jamming indication,
  otherwise repeating said steps of measuring and analyzing.

With this embodiment the described requirements are configurable for the communication user equipment. In particular the control unit provides with said registration request to the communication unit a predefined jamming probability threshold and receives said jamming indication not before the jamming probability threshold is received.

It is further suggested a method wherein in case repeating said steps of measuring and analyzing shows no detection of a jamming transmitter, decreasing said jamming probability counter.

With this embodiment a detection of the contested pattern of signal level in successive time unit for one time is taken into account for the jamming probability level. In particular a jamming transmitter which is not permanently sending can still be detected, compared to a solution where only one well received frame would completely reset the jamming probability counter. Such jamming transmitters nevertheless massively disturb the wireless communication but are harder to detect. With this embodiment those jammers are also detectable.

Preferably other criteria are used additionally for impacting the jamming probability level. One criteria is the mere energy of received during a suspectedly jammed frame. The higher the energy the higher is the probability that a jamming transmitter is present. Consequently it is proposed that the jamming probability level is increased when this situation is detected by a higher amount.

Another criterion for TDD-LTE is the frequency bands. As it is known eNodeBs, up to five frequency bands may be supported. The inventive method is consequently repeated for all of those frequency bands. Hence, if the jamming situation is detected for all frequency bands then the probability of being jammed is rather high, which is preferably taken into account for the jamming probability level.

The same applies when for one of the frequency bands a communication is possible again, that means after the decoding of a downlink radio channel was not possible, in a later frame it worked. For each of the frequency bands where this is detected preferably the jamming probability counter is decreased.

As set out above the goal is still to figure out in case of a not decodable downlink radio channel, if the communication user equipment is affected by a jamming transmitter or in an out of service situation. When no time unit, in particular of a frame is found with a signal level exceeding the predefined threshold, in particular the decoding limit, then the case is clear: the communication user equipment is neither in the proximity of an operational base station, nor in the proximity of another communication user equipment. This is the total out of service situation.

More complicated is the situation, if other communication user equipments operating in the same cellular network at the same active base station are nearby the respective communication user equipment. Then the condition of at least one time unit with a signal level exceeding the predefined threshold might be found.

It is therefore proposed according to another preferred embodiment a method wherein in case the step of verifying indicates that the first time unit has a signal level below the predefined threshold and the second time unit has a signal level below the predefined threshold, detecting an out of service situation.

This embodiment in particular applies to the special subframe, where all other communication user equipments are configured not to perform sending operations. When in this subframe the guard period is preceded by a DwPTS with a signal level below the predefined threshold, this indicates that instead of a jamming transmitter an out of service situation is detected.

The proposed solution is advantageous as it is both configurable with respect to the reliability and/or timeliness, but on the other hand allows covering all possibility once it is detected that a previously decoded downlink radio channel is not decodable anymore.

According to a second aspect of the invention it is proposed a communication user equipment configured to operate in a cellular network supporting uplink and downlink communication on one frequency band in a time-division manner, the cellular network comprising a plurality of base stations, including at least one active base station, which is the base station the communication user equipment is camping on, the communication user equipment is adapted to detect a jamming transmitter, the communication user equipment further comprising a channel detection unit, a measuring unit and an analyzing unit, wherein
  the channel detection unit being configured to detect that at least one downlink radio channel from the active base station is not decodable,
  the measuring unit being configured to measure signal levels received on said downlink radio channel for a plurality of time units,
  the analyzing unit being configured to:
  in response to the channel detection unit indicating that the downlink radio channel is not decodable analyze said signal level measurements measured by the measuring unit, the analyzing unit is further configured in case at least one time unit is detected with a signal level exceeding a predefined threshold, to detect a jamming transmitter by verifying the condition that in a predefined amount of successive time units the pattern of a first time unit with signal level exceeding the predefined threshold directly followed by a second time unit with a signal level below the predefined threshold is not detected.

According to this aspect the communication user equipment comprises a couple of units, in particular the channel detection unit, the measuring unit and the analyzing unit. For the context of a communication user equipment comprising a communication unit, in particular a machine-to-machine-module, it is preferred if at least the channel detection unit and the measuring unit are situated in the communication unit. This is advantageous as all air interface related activities are executed by the communication unit.

Regarding the analyzing unit it is a question of responsibility, if the analyzing unit is situation in the communication unit or the control unit, resp. other units directly connected to the control unit. In the first case the communication unit takes the decisive steps, but requires configuration from the control unit. In the second case the control unit makes the decision, but needs to be informed about all relevant measurements.

Apart from the sharing of tasks within the communication user equipment, the proposed aspect shares the advantages of the first aspect.

As it is shown this invention advantageously solves the depicted problem and suggests a method and communication user equipment which allow a detection of jammers and a distinction from an out of service situation and other communication user equipments sending on the frequency of a downlink radio channel.

BRIEF DESCRIPTION OF THE DRAWINGS

The following description and the annexed drawings of advantageous embodiments set forth in detail certain illustrative aspects and are indicative of a few of the various ways in which the principles of the embodiments may be employed. Characteristics and advantages of the present invention will become apparent from the following description and annexed drawings, which are given as illustrative but not restrictive examples of all such aspects and their equivalents.

FIGS. 1a+b represent the situation of a communication user equipment in a TDD cellular network affected by a jamming transmitter or another communication user equipment FIG. 3 shows for LTE-TDD the distribution of downlink, uplink and special subframes dependant from configurations

FIG. 1 schematically shows in FIG. 1a and FIG. 1b the situation of a communication user equipment A of the type to which the present invention is applied as an embodiment, which is unable to decode at least one downlink radio channel received from the base station BS. In FIG. 1a it is assumed that communication user equipment A was camping on base station BS. Hence, base station BS is from the perspective of the communication user equipment A the active base station. In the event of an incoming or outgoing call or data connection, the communication user equipment A is expecting to conduct this with the active base station BS.

Due to the fact that the communication user equipment A is moving, it leaves the coverage area C of the active base station BS. This results in the situation that at least one downlink radio channel, in this case the BCH, cannot be decoded by the communication user equipment A anymore. Normally the situation of a communication user equipment A leaving the coverage area of a base station is easily detectable, as in this case the appearing of a not decodable downlink radio channel is accompanied by a reduction of the signal level on the downlink radio channel is reduced under a predefined threshold, in particular the decoding level.

In the situation shown in FIG. 1a now a second communication user equipment B is located in the proximity of the communication user equipment A. Due to the fact that in TDD the uplink and downlink channels are transmitted by using the same frequency band, now a communication user equipment B sending data to the base station BS appear as a signal level on the evaluated frequency band. This means for communication user equipment A the situation of a non decodable downlink radio channel with a signal level in the frequency band of said downlink radio channel, wherein the same frequency band is also used at different times for the uplink signals by other communication user equipment B.

FIG. 1b shows in comparison to that the communication user equipment A which is situated within the coverage area C of the active base station BS. In this case the downlink radio channel BCH is nevertheless not decodable due to the fact that here a jamming transmitter J is situated close to the communication user equipment A. This jamming transmitter J emits in a wideband or narrowband way noise over the frequency band of the downlink radio channel BCH. Thus the communication user equipment A has no possibility to decode the downlink radio channel BCH. Here again the communication user equipment A is in the situation of a non decodable downlink radio channel with a signal level in the frequency band of said downlink radio channel BCH.

The objective of present inventive method is therefore to provide means for the communication user equipment A to discriminate these both situations, and consequently preferably inform the user of the communication user equipment A of the situation. This allows the user in the situation of FIG. 1b, to take certain measures, in particular for a car with an anti-theft system, that it is e.g. to another place, at least not left alone.

The proposed inventive method takes advantage of some peculiarities of the technology standards relating to cellular networks supporting TDD. Generally there is the issue that the technology standard defines the situation that either in uplink or in downlink direction data are supposed to be sent. Here the inventive solution comes into play and identifies a special signal evaluation structure which either shows the situation of FIG. 1a or FIG. 1b.

Figure 2:
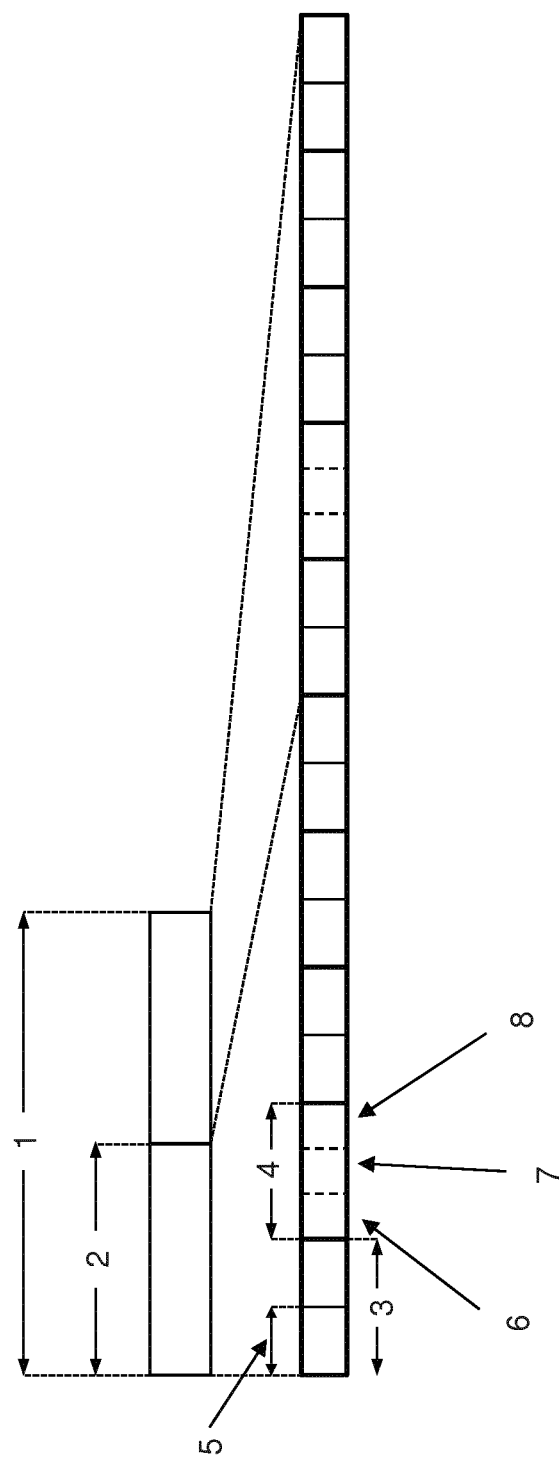
FIG. 2 shows the frame structure according to the LTE-TDD standard

For the example of LTE-TDD standard cellular networks the frame structure type 2 is shown in FIG. 2 following TS36.211. Here it is displayed a radio frame 1, subdivided into two half-frames. The duration of one radio frame is 307200 times of the basic time unit $T_s$, with $T_s=1/(15000\times$ 2048) seconds. This results to a duration of 10 milliseconds (ms) for one frame 1, and consequently 5 ms per half-frame 2.

The lower line shows the details of a half-frame 2. Each half-frame is divided into five subframes 3 with a duration of 30720×T$_s$=1 ms. A subframe 3 is generally further dived in two slots 5, with half of the duration of the subframe 3, hence 0.5 ms.

The second subframe of the shown frame 1 resp. half-frame 2 has a different structure than the other subframes 3. This is the special subframe 4, which consists of three fields, the downlink pilot time slot (DwPTS) 6, the guard period (GP) 7 and the uplink pilot time slot (UpPTS).

The question how often the special time slot 4 appears in a frame is depending upon the uplink/downlink configuration shown in FIG. 3. This is selected based on the traffic scheme, e.g. data/voice mixed traffic has a different configuration than traffic with sensitive transmission delay. The table T1 shows seven different configurations of subframes 3 in a frame 1. Each subframe for downlink signaling is marked with a D, each subframe with uplink signaling is marked with U and each special subframe 4 is marked with a S. This shows that there are per frame either one or two special subframes 4 foreseen. This means, in the situations of uplink/downlink configuration 0,1,2,6 the subframe #1 and #6 are special subframes 4. This is also indicated for frame 1 shown in FIG. 2, where also in the second half-frame of frame 1 a special subframe is indicated.

Figure 4:
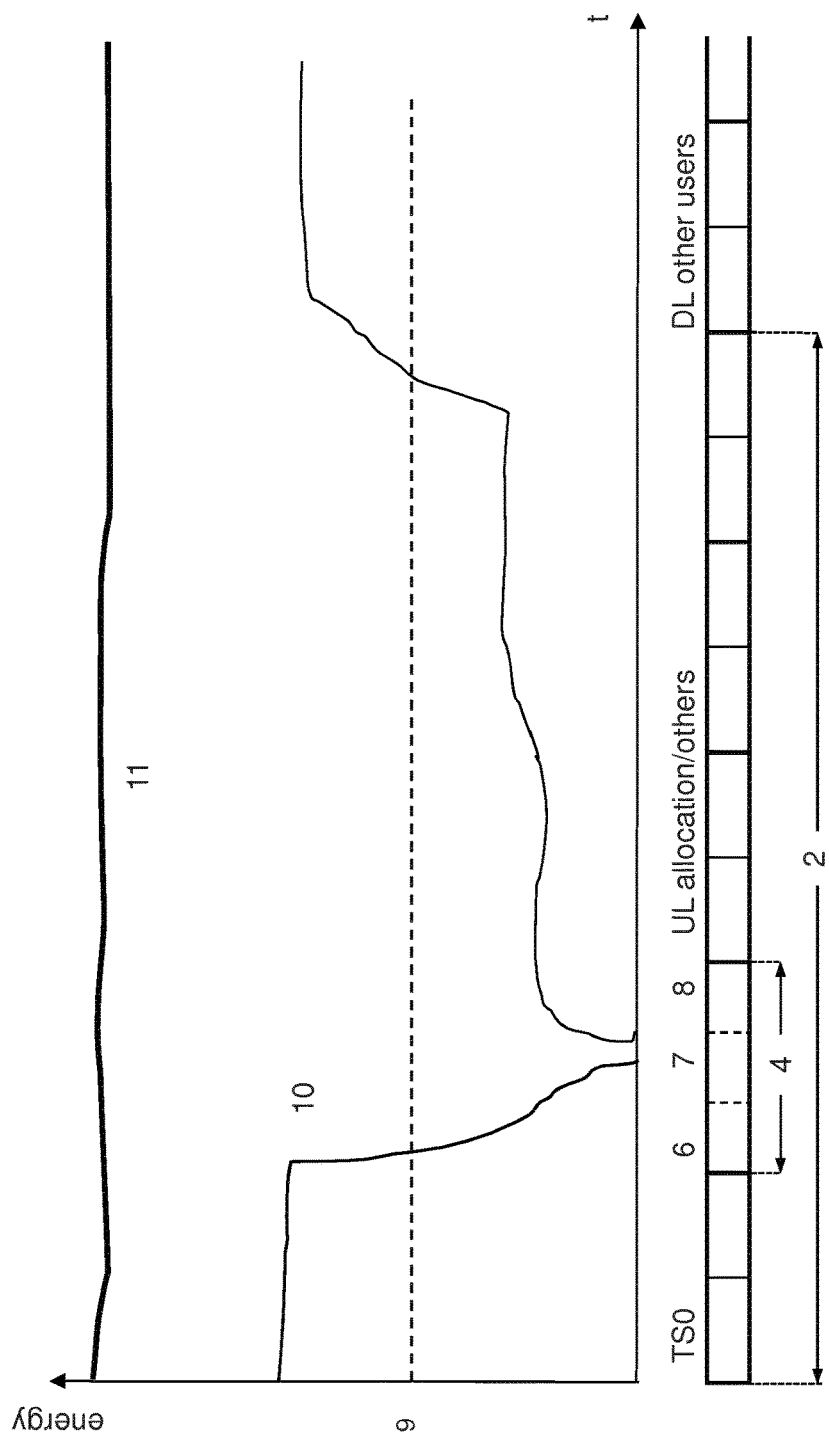
FIG. 4 represents the energy situation for a LTE-TDD frequency band in the jamming situation

With this background now the energy distribution 10 over a half-frame 2 which is expected at a communication user equipment A within the coverage area C of a base station BS is shown in FIG. 4. On the ordinate the energy as a measure of signal level is shown, on the abscissa the time, her in the range of about a half-frame 2.

Within the first subframe TS0 which is a downlink subframe, there is expected transmissions from the base station BS, resulting in a energy level above the decoding limit 9 indicated with the dashed line. Then it follows the special subframe 4, with a first of three fields comprising the downlink pilot time slot 6. Within this downlink pilot there is expected as part of the pilot channel a transmission from the base station BS with energy above the decoding limit 9. The downlink pilot time slots comprises in particular control signaling and/or synchronization signaling.

The DwPTS 6 is followed by the guard period 7. In this field it is assured according to the LTE-TDD standard that the energy falls from the level of the DwPTS 6 down to a theoretical minimum of ground noise. Due to time delayed and multipath propagation signals transmitted in the DwPTS from synchronous neighbor base stations and UL timing advance applied transmissions in the UpPTS the edge of the energy curve is somewhat less steep, but due to the pre-defined length of the guard period 7 it is assured that at least for a certain share of the time slot of the guard period 7 shows an energy level below the decoding limit 9, and even less at the receiving communication user equipment. The above finding applies to all configurations of the special subframe for the length of DwPTS/GP/UpPTS as it is provided by the technology standard.

The next field comprises the uplink pilot time slot (UpPTS) 8, which is for transmission of data from one or more communication user equipment to the base station BS. This is typically followed by at least one subframe for uplink communication. Depending on the communication user equipment A and other communication user equipments B here a higher or lower energy level might appear.

FIG. 4 shows further the energy distribution 11 in case of a jamming transmitter affecting the communication user equipment. The mere level of the energy from jamming transmitter might vary but it is not expected to be below the decoding limit 9.

Figure 5:
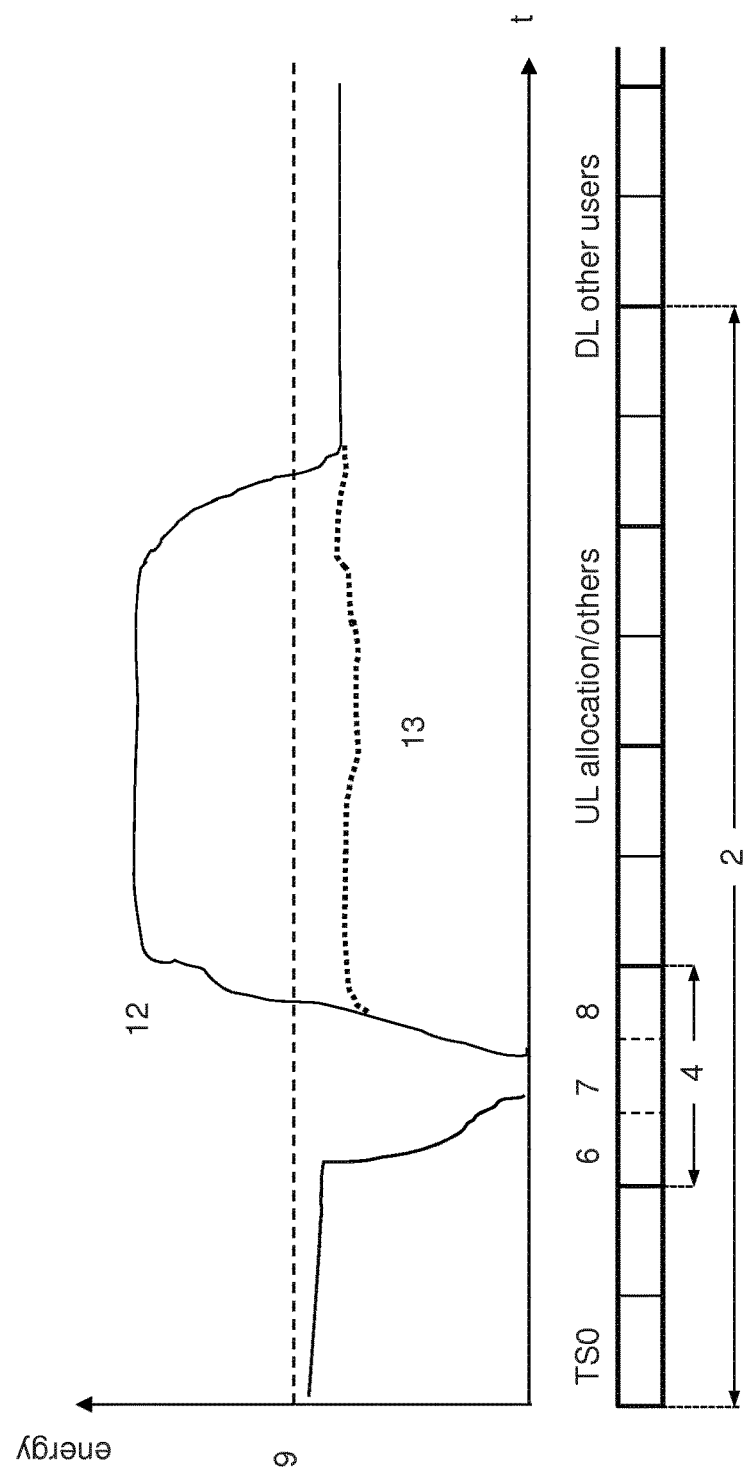
FIG. 5 represents the energy situation for a LTE-TDD frequency band in the out of service situation

Compared to that FIG. 5 shows the energy distribution 12 for a communication user equipment located outside of the coverage area of the base station BS according to FIG. 1a. The major difference appears already in the first subframe TS0, wherein downlink transmissions are received below the decoding limit 9. This also applies to the downlink pilot time slot 6. Nevertheless, for the guard period 7 the energy level still is reduced to the minimum. The following uplink pilot time slot 8 resp. uplink subframes provide compared to that in the example shown in FIG. 1a a higher energy level, which results mainly from other communication user equipments B in the proximity of the respective communication user equipment A.

This situation shows that although the communication user equipment A is outside of the coverage area of the active base station BS, and in particular outside of the coverage area of other base stations of the cellular network as well, there is nevertheless the possibility to receive energy above the decoding limit 9 at the communication user equipment A. In this situation jamming detection mechanisms working for cellular networks supporting FDD would indicate a jamming transmitter also for the energy distribution 12.

Alternatively the subsection 13 of the energy distribution shows in dotted lines the situation without another communication user equipment in the proximity. Depending upon whether other devices are present at all and what is their respective distance the received energy may be lower or higher, which would influence the height of the dotted line in the drawing. This effectively means that no time unit over a frame appears with an energy level above the decoding level 9.

As it can be seen more elaborate methods are needed to reliably and still quickly detect a jamming transmitter and avoid false alarms in particular in an out of service area.

Figure 6:
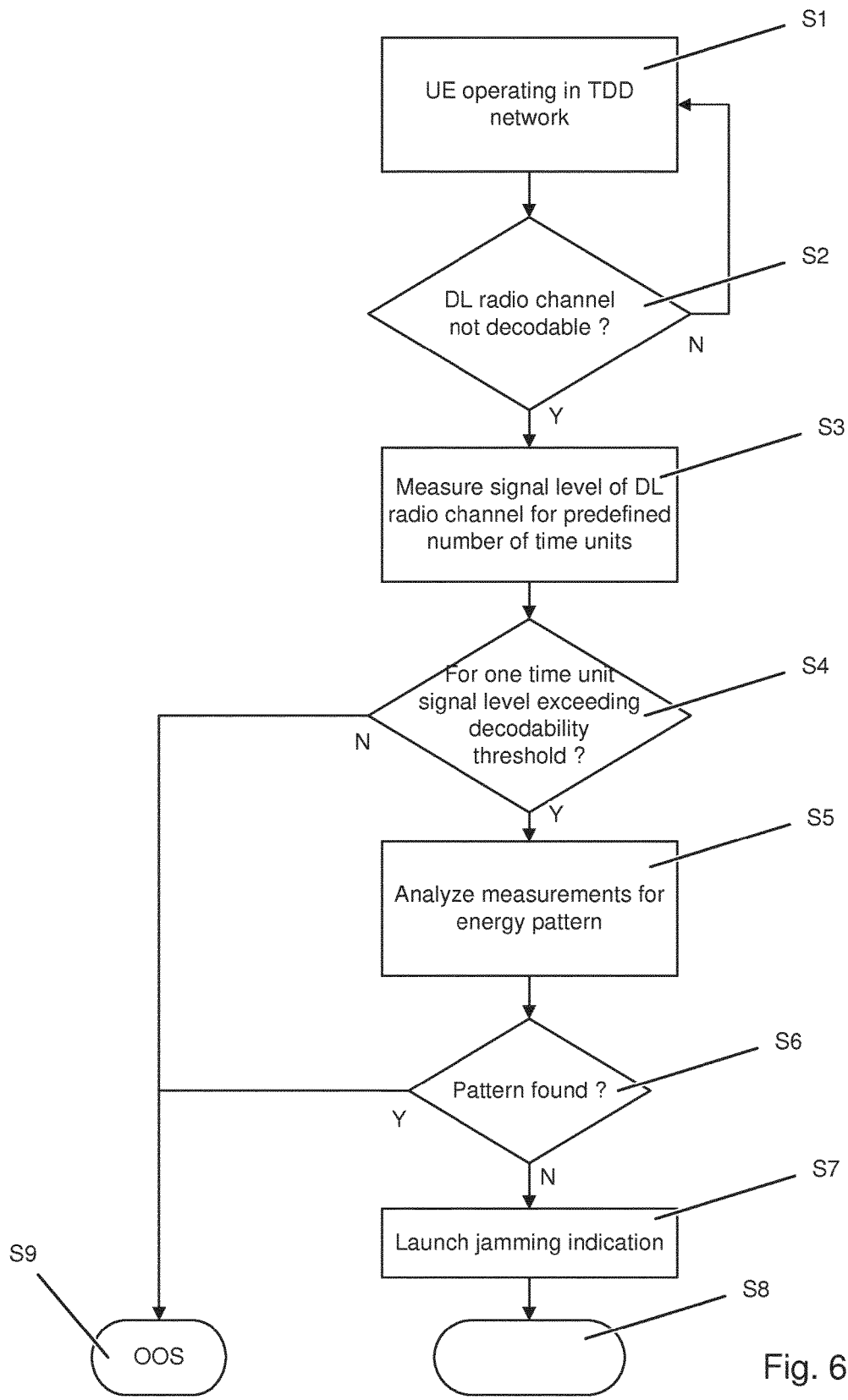
FIG. 6 represents a flow chart depicting one embodiment of the inventive method

The general process of the inventive method is shown in the exemplary flow chart of FIG. 6 outlining a preferred embodiment of the method.

The method starts in step S1 with the situation of the communication user equipment (UE) is operating in a cellular network supporting TDD. That means that the communication user equipment is registered and camping on an active base station of the cellular network. With this the communication user equipment is sure that a compatible cellular network is in reach. This discriminates from situations where the communication user equipment is switched on in an area without cellular network coverage or with a network type or frequency range not supported by the communication user equipment. It is important that in those situations the communication user equipment does not mistakenly assumes a jamming transmitter and sends a jamming alert.

In the next step S2 it is checked if a certain downlink (DL) radio channel is decodable. Practically the communication user equipment is configured to jump into the jamming detection mode, once it detects that the previously decodable downlink radio channel is suddenly decodable. Otherwise the communication user equipment continues to operate with the active base station as usual, which is indicated with the No-branch back to step S1.

If the at least one downlink radio channel is not decodable the process flow continues with the yes-branch to step S3. As a first step now measurements of the signal level of the affected downlink radio channel are made for a predefined number of time units. This is in particular the measurement of the received power spectral density over time at the antenna connector from the communication user equipment. The time units correspond in particular to subframes or time slots, and the number of time slots is preferably covering one half-frame or frame.

In a preferred embodiment the predefined number of time units is depending upon the uplink/downlink configuration as shown in FIG. 3, which means that for the uplink/downlink configurations with two special subframes it is sufficient to measure over a half-frame.

Advantageously the result of step S3 is a mean value of signal level for each time unit.

In a first analyzing step it is now analyzed, if for any time unit a signal level exceeding the decoding level is detected. If this is not the case then the situation of FIG. 5 with energy distribution 13 is present.

It is obvious that this is not a jamming situation but an out of service situation. Consequently in case of this outcome the workflow branches to step S9 indicating an out of service situation.

Otherwise it requires a more elaborate analysis of the measured signal level over the time units in order to distinguish the situation. For that it is branched to step S5. Here are analyzed the measurements if a condition is fulfilled that a certain energy pattern is found. This pattern comprises at minimum that a time unit is found with a signal level exceeding a predefined threshold, in particular the decoding limit, and this first time unit is directly followed by a second time unit with a signal level below the predefined threshold. As it can be seen in FIG. 4, the energy distribution 11 of the jamming transmitter shows for all time units of the frame above the decoding limit, while the normal energy distribution shows situation at least for the DwPTS 6 a signal level above the decoding limit and for the guard period 7 in any case an signal level below the decoding limit. In FIG. 5 it can be seen that even if the base station is too far away for sending above the decoding limit, other communication user equipments are creating an energy level above the decoding limit shown in the energy distribution 12. But the other communication user equipments are not transmitting permanently, as they also respect the special subframe and at least during the guard period 7 they do not transmit.

The result of the analysis from step S5 is then contested in step S6. If the pattern is found, then an out of service situation is detected. Thus it again branches to step S9. If the pattern is not found, then a jamming situation is detected and therefore it branches to step S7, where a jamming indication is launched.

With the jamming indication, which is in particular provided from the communication unit of the communication user equipment to the control unit, the process stops (S8). It is up to the control unit, resp. the whole device designer how to react on a detected jamming transmitter.

Figure 7:
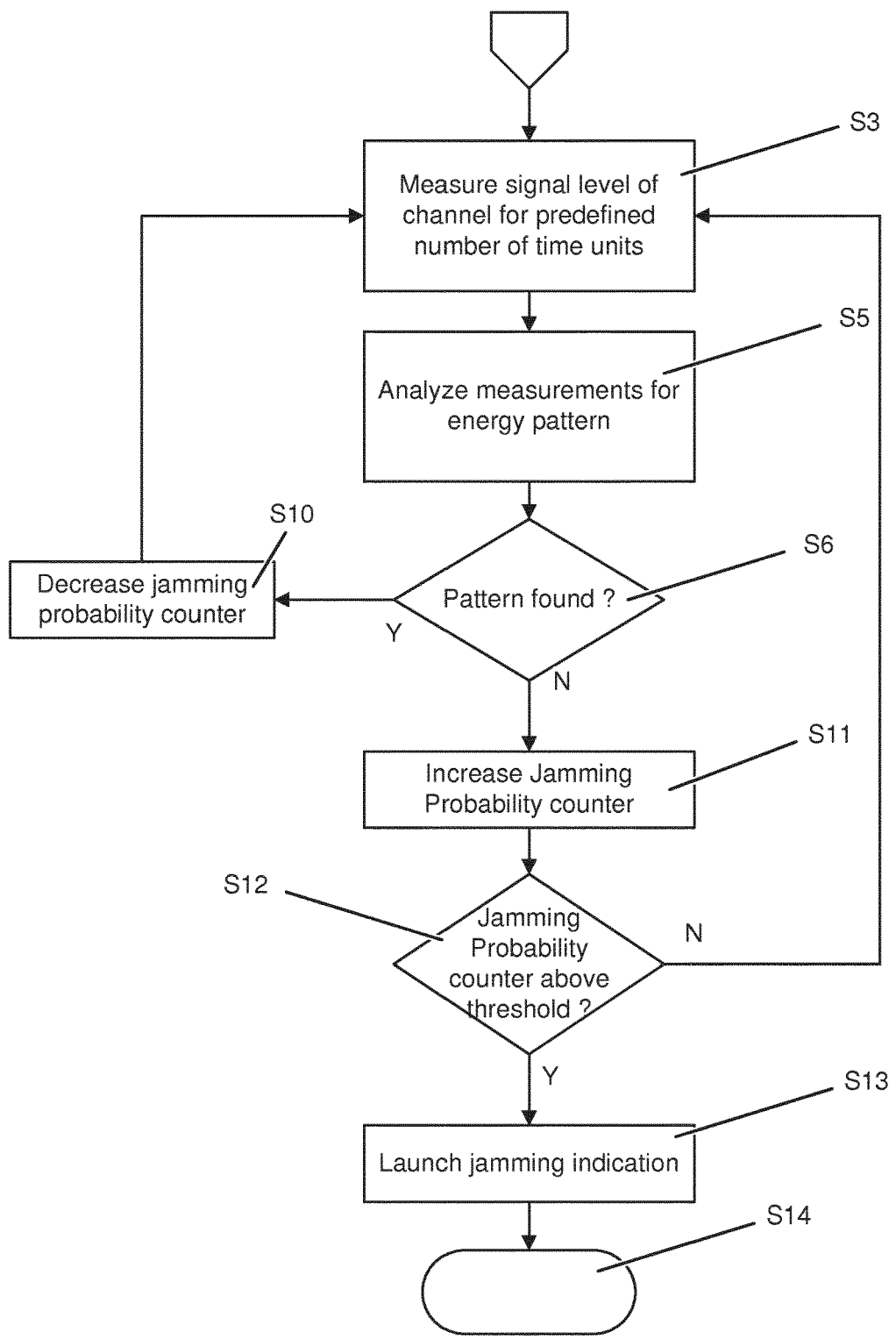
FIG. 7 represents a second flow chart depicting another embodiment of the inventive method.

To reassure the detection of the jamming transmitter it is advantageous to repeat the whole event flow, like is shown in another exemplary flow chart in FIG. 7.

The start of the event flow is similar to the one shown in FIG. 6, which means that once a non decodable downlink radio channel is determined, although the communication user equipment was previously camping on a base station of the cellular network. Therefore the steps S3 to S5 are similar to the previously shown flow diagram.

After analyzing the measurement for the energy pattern in step S5 it is checked if the pattern is found in step S6. If the pattern is not found, the event flow branches to step S11. Instead of simply outputting a jamming indication, now a jamming probability counter is increased.

The jamming probability counter is a counter which tracks if jamming indications are detected. Preferably the jamming probability counter is initialized at the beginning, in particular when the communication user equipment successfully registered and started camping on a base station.

Other criteria used for influencing the jamming probability counter are also foreseen. In particular the increase might be higher, if the amount of measured time units covers a whole frame rather than a half-frame.

Further the signal level or an average signal level or a variance of the signal level are preferably taken into account for increasing the jamming probability level, in particular be which amount the jamming probability counter is increased.

Advantageously a communication unit where the process is implemented is further configured to send an URC when the jamming probability counter is updated.

This allows a control unit communicatively coupled to the communication unit to take early steps, although the jamming indication is not yet launched.

If the pattern is found in S6, then in step S10 the jamming probability counter is decreased, at least as long as the jamming probability is above a lower boundary, in particular above zero.

After increasing the jamming probability counter in step S11 it is checked in step S12 if the jamming probability counter exceeded a predefined threshold for the jamming probability. If not, then the event flow jumps back to S3. That means that for another predefined number of time units the measuring step S3 is repeated.

If the predefined threshold of the jamming probability counter is exceeded then in step S13 a jamming indication is launched. This type of jamming indication provides more reliability but requires more time to come to a result.

The probability threshold is in particular configured by the control unit of the communication user equipment. This is in particular done by an AT command send to the communication unit for switching on the jamming detection mechanism. As such the AT command is in particular equipped with the jamming probability threshold preferably indicating the amount of time frames, or repetitions of the whole process.

In case the downlink radio channel is decodable again, then the jamming probability counter is decreased resp. reset and the shown event flow is skipped.

With the next indication of a non decodable downlink radio channel, the procedure is started again.

Above described steps may also be repeated for all TDD-LTE frequency ranges/bands the UE has capability for, knowing that TDD-LTE is deployed. The jamming probability counter is according to that in particular increased depending on the detected number of jammed frequency bands and is decreased if one frequency band is found allowing communication. Latest if all frequency bands are able to be decoded again consequently finally the jamming probability counter is set to the initial value.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Method for detecting a jamming transmitter affecting a communication user equipment,
said communication user equipment operating in a cellular network supporting uplink and downlink communication on one frequency band in a time-division manner, the cellular network comprising a plurality of base stations, including at least one active base station, on which the communication user equipment is camping,
the method comprising the following steps for the communication user equipment:
detecting that at least one downlink radio channel from the active base station is not decodable,
measuring signal levels received on said downlink radio channel for a plurality of time units,
analyzing said signal level measurements,
in case at least one time unit is detected with a signal level exceeding a predefined threshold,
detecting a jamming transmitter by verifying a condition that, in a predefined amount of successive time units, a pattern of a first time unit with signal level exceeding the predefined threshold directly followed by a second time unit with a signal level below the predefined threshold is not detected.

2. Method according to claim 1,
the cellular network providing a frame structure including a special subframe comprising a downlink pilot time slot and a guard period,
wherein the first time unit and the second time units are time units being part of the special subframe, and wherein the first time unit is part of the downlink pilot time slot and the second time unit is part of the guard period.

3. Method according to claim 1,
wherein the predefined threshold of signal level corresponds to a decoding limit.

4. Method according to claim 1,
wherein the plurality of time units corresponds to a frame.

5. Method according to claim 1,
wherein said signal level corresponds to received power spectral density over time.

6. Method according to claim 1,
wherein said communication user equipment comprises a communication interface and a control unit, and wherein upon detection of the jamming transmitter by the communication interface,
the communication interface sending a jamming indication to the control unit, and
the control unit alerting a user.

7. Method according to claim 6,
the communication user equipment further comprising a jamming probability counter,
the method further comprising the steps:
upon detection of a jamming transmitter, increasing the jamming probability counter,
verifying if the jamming probability counter exceeds a jamming probability threshold value,
in case the jamming probability threshold value is exceeded, sending said jamming indication,
otherwise repeating said steps of measuring and analyzing.

8. Method according to claim 7,
in case repeating said steps of measuring and analyzing shows no detection of a jamming transmitter, decreasing said jamming probability counter.

9. Method according to claim 1,
wherein in case the step of verifying indicates that the first time unit has a signal level below the predefined threshold and the second time unit has a signal level below the predefined threshold, detecting an out of service situation.

10. Communication user equipment configured to operate in a cellular network supporting uplink and downlink communication on one frequency band in a time-division manner, the cellular network comprising a plurality of base stations, including at least one active base station, on which the communication user equipment is camping,
the communication user equipment is adapted to detect a jamming transmitter,
the communication user equipment further comprising a communication interface and a control unit, wherein
said communication interface is configured to:
detect that at least one downlink radio channel from the active base station is not decodable, and
measure signal levels received on said downlink radio channel for a plurality of time units, and wherein
one of said communication interface and said control unit is configured to:
in response to the communication interface indicating that the downlink radio channel is not decodable, analyze said measured signal level measurements, and
in response to at least one time unit being detected with a signal level exceeding a predefined threshold, detect a jamming transmitter by verifying a condition that, in a predefined amount of successive time units, a pattern of a first time unit with signal level exceeding the predefined threshold, directly followed by a second time unit with a signal level below the predefined threshold, is not detected.

11. Communication user equipment according to claim 10,
wherein the cellular network in which the communication user equipment is operating, is configured to provide a frame structure including a special subframe comprising a downlink pilot time slot and a guard period,
wherein the first time unit and the second time units are time units being part of the special subframe, and wherein the first time unit is part of the downlink pilot time slot and the second time unit is part of the guard period.

12. Communication user equipment according to claim 10,
wherein upon detection of the jamming transmitter by the communication interface, the communication interface is configured to send a jamming indication to the control unit, and
the control unit comprising a user interface, and the control unit is configured to alert a user by means of the user interface.

13. Communication user equipment according to claim 12,
further comprising a jamming probability counter,
the communication user equipment is configured,
upon detection of a jamming transmitter to increase the jamming probability counter, to verify if jamming probability counter exceeds a jamming probability threshold value,
in case jamming probability threshold value is exceeded, to send said jamming indication,
otherwise to repeat said measuring and analyzing.

14. Communication user equipment according to claim 13,
further configured, in case repeating said measuring and analyzing, shows no detection of a jamming transmitter, to decrease said jamming probability counter.

15. Communication user equipment according to claim 10,
wherein one of said communication interface and said control unit is further configured, in case said verifying indicates that the first time unit has a signal level below the predefined threshold and the second time unit has a signal level below the predefined threshold, to detect an out of service situation.

\* \* \* \* \*